US008727805B2

(12) United States Patent
Giustina et al.

(10) Patent No.: US 8,727,805 B2
(45) Date of Patent: May 20, 2014

(54) SMALL FORM FACTOR COMPUTING DEVICE WITH CONNECTOR ASSEMBLY TO INTERCONNECT SLIDING HOUSING SEGMENTS

(75) Inventors: Giancarlo Anthony Giustina, San Francisco, CA (US); Jason Conrad Chamberlain, Campbell, CA (US); Stephen Schooley, San Jose, CA (US); Christopher Kraeutle, Santa Clara, CA (US); Mostafa Kashi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 13/170,963

(22) Filed: Jun. 28, 2011

(65) Prior Publication Data

US 2012/0202375 A1 Aug. 9, 2012

Related U.S. Application Data (60) Provisional application No. 61/440,321, filed on Feb. 7, 2011.

(51) Int. Cl.
*H01R 11/00* (2006.01)

(52) U.S. Cl.
USPC .......................................................... 439/505

(58) Field of Classification Search
CPC ... G06F 1/1624; G06F 1/1683; H01R 25/003; H01R 31/02; H01R 27/02; H01R 29/00; F21S 4/001
USPC ................. 439/505, 502, 540.1, 701, 578
See application file for complete search history.

(56) References Cited

U.S. PATENT DOCUMENTS

| 6,079,993 | A  | * | 6/2000  | Laine ............................ 439/165 |
| 6,973,186 | B2 | * | 12/2005 | Shin .......................... 379/433.12 |
| 8,063,310 | B2 | * | 11/2011 | Matsukawa et al. ........ 174/117 F |
| 8,169,794 | B2 | * | 5/2012  | Matsukawa et al. ........... 361/826 |
| 8,420,936 | B2 | * | 4/2013  | Huang et al. ................. 174/74 R |
| 2010/0093207 | A1 | * | 4/2010 | Matsukawa et al. .......... 439/502 |
| 2010/0243293 | A1 | * | 9/2010 | Tanaka ....................... 174/117 F |
| 2010/0246107 | A1 | * | 9/2010 | Matsushima et al. .... 361/679.01 |

* cited by examiner

*Primary Examiner* — Edwin A. Leon
(74) *Attorney, Agent, or Firm* — Mahamedi Paradice Kreisman LLP (57) ABSTRACT

A mobile computing device is presented. The mobile computing device has two housing segments that each contains a set of electrical components. The housing segments are slideably coupled to each other to move between a first position and a second position. The mobile computing device also has a cable connector that connects the sets of electrical components together. The cable connector is configured to include three connector structures that are each configured to mate with a connector. A first connector structure is configured to mate with a first connector of the first housing segment in connecting to the first set of electrical components. Similarly, a second connector structure is configured to mate with a first connector of the second housing segment in connecting to a first portion of the second set of electrical components. The third connector structure is configured to mate with a second connector of the second housing segment in connecting to a second portion of the second set of electrical components.

16 Claims, 6 Drawing Sheets

SMALL FORM FACTOR COMPUTING DEVICE WITH CONNECTOR ASSEMBLY TO INTERCONNECT SLIDING HOUSING SEGMENTS

This application claims the benefit of priority under 35 U.S.C. 119(e) to Provisional Application Ser. No. 61/440,321, filed Feb. 7, 2011, titled "Small Form Factor Computing Device with Connector Assembly to Interconnect Sliding Housing Segments", which is incorporated herein by reference in its entirety.

BACKGROUND OF THE INVENTION

Mobile computing devices, such as smart phones, have different types of form factor designs. With the high demand for small mobile computing devices, there is challenge to design the devices to include as many features as possible, while at the same time, keeping the overall size of the devices to a minimum.

This challenge is even more evident with slider phone designs where the two housing segments of the cell phone can be small in size (e.g., width and thickness). With the size of the mobile devices being a physical constraint, different means and mechanisms must be utilized to implement a variety of features without having to increase the size of the form factor of the mobile device. In addition, like other electrical components, there is a challenge to provide small connectors and cables within the housing of the device while providing high quality performance. For example, while a flex cable is beneficial for enabling the movement of the two housing segments in a sliding cell phone design, it does not provide good shielding for signal integrity. Better designs for small connectors and cables are needed.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein include a mobile computing device having a cable connector that can interconnect sets of electrical components within different housing segments of the mobile computing device. Moreover, the cable connector is designed to provide flexibility in designing and laying out the electrical components within the mobile computing device, while providing high-quality signal performance between the electrical components.

According to some embodiments, the cable connector includes a cable that has a plurality of strands that are splayed and arranged in a line. The cable is split at least along a portion of the cable and portions of the cable are stacked to minimize the size of the cable connector within the housing segments of the mobile computing device. The cable has a plurality of strands that are each configured to carry signals. By splitting the cable along at least a portion of its length and by stacking a set of the strands on top of another, the overall bulkiness of the cable connector can be reduced. In addition, the size of the connector structures that are configured to mate with the corresponding connectors of the sets of electrical components can be minimized to allow for different connector sizes, angles and positions for coupling to the electrical components.

In one embodiment, the first housing segment of the mobile computing device includes a first set of electrical components while the second housing segment includes a second set of electrical components. The first and second housing segments are slideably coupled to one another so that the second housing segment can move between a first position and a second position. The cable connector is designed to enable the two housing segments to move about the two positions while maintaining the interconnection between the two sets of electrical components.

The cable connector of the mobile computing device includes three connector structures, according to an embodiment. The first connector structure is configured to mate with a first connector of the first segment in connecting to the first set of electrical components. The second connector structure is configured to mate with a first connector of the second segment in connecting to the second set of electrical components. The third connector structure is configured to mate with a second connector of the second segment in connecting to the second set of electrical components.

Other embodiments described herein include a cable connector that includes a cable that interconnects the first connector structure, the second connector structure and the third connector structure. In one or more embodiments, the cable is a coaxial or micro-coaxial cable.

In another embodiment, the first connector structure is splayed to provide a number of connection points (or contacts or pins) in a linear fashion. The cable is connected to the first connector structure so that each of the plurality of strands of the cable connects to each of the connection points provided on the first connector structure. Similarly, the second connector structure and the third connector structure are also splayed to provide connection points in a linear fashion. The other end of the cable is connected to the second connector structure and the third connector structure with the strands terminating at the connection points of the second and third connector structures. The number of connection points provided on the first connector structure is equal to the total number of connection points provided on the second and third connector structures.

Embodiments described herein also include a cable connector in which a first set of strands of the cable are stacked on top of a second set of strands along a portion of the length of the cable. In one embodiment, the cable is also splayed so that the strands of the cable are positioned in a linear fashion along at least a portion of the length of the cable. The first set of strands of the cable can also be a different length than the second set of strands of the cable. The cable can also include a flexible portion and a fixed portion so that the connector structures and the connectors remain mated when the mobile computing device is in the first position or the second position.

In other embodiments, the mobile computing device also comprises a spring to assist or enable the second segment to slideably move between the first position and the second position. The cable of the cable connector can be positioned within a reserved space of the spring when the second segment is in the first position.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources, including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones or tablet devices) are all examples of machines and devices that utilize processors, memory, and instructions stored on computer-readable mediums.

Overview

Figure 1:
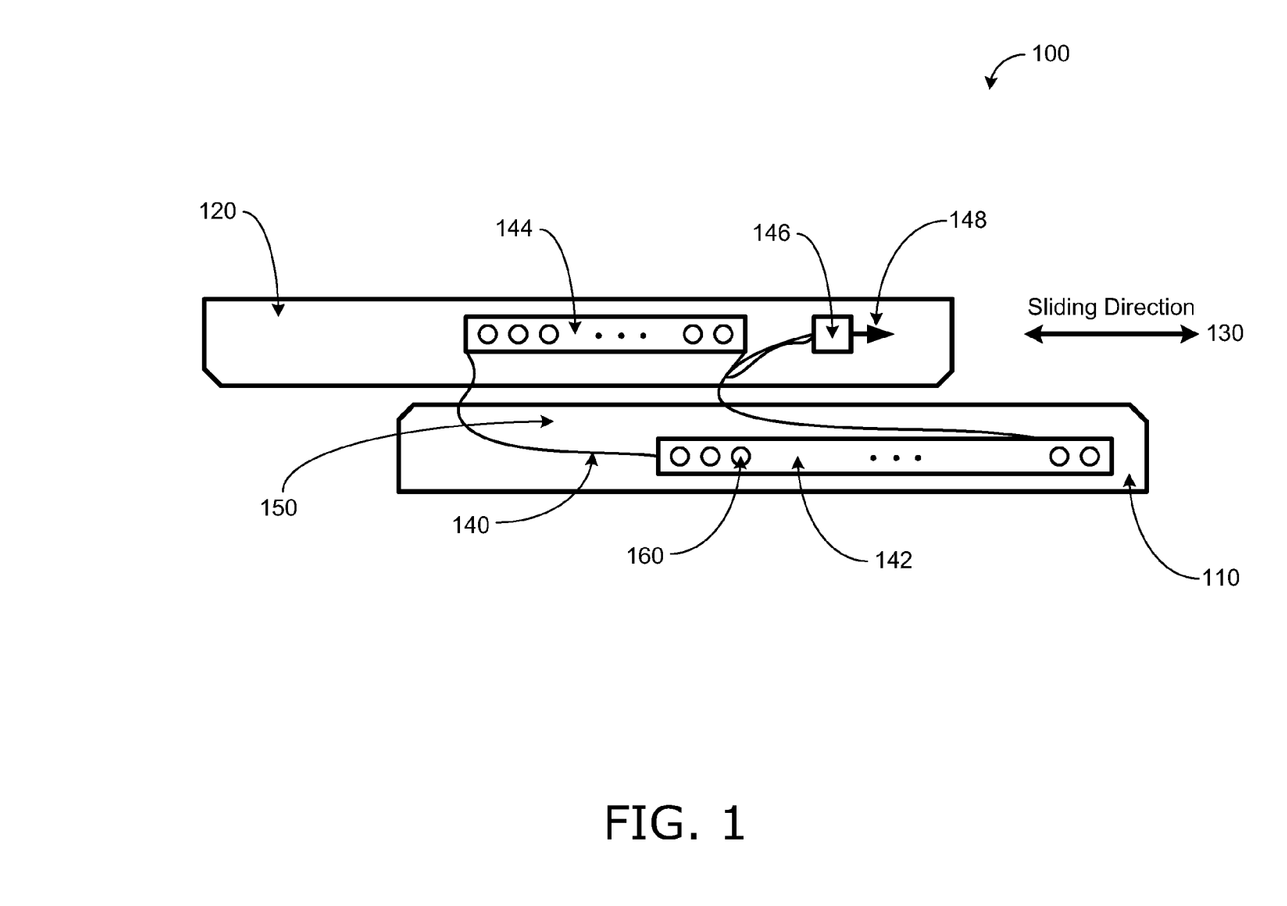
FIG. 1 is an illustration of a mobile computing device including a cable connector under an embodiment.

FIG. 1 is an illustration of a mobile computing device that includes a cable connector under an embodiment. The mobile computing device 100 comprises of two housing segments that each includes a set of electrical components. The cable connector 140 interconnects the sets of electrical components while maintaining connectivity even with the movement of the housing segments. The cable connector 140 includes a cable 150 that has a plurality of strands for transmitting and/or receiving signals from electrical components. The strands are connected to three or more connector structures and can be organized in a stacked configuration along portions of the cable 150. Use of the cable connector 140 can promote the flexibility of designing and laying out the electrical components of a mobile computing device.

As examples, the mobile computing device 100 may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

The cable connector 140 of the mobile computing device 100 is structured to enable the two housing segments to slide about each other while maintaining a connection between the electrical components housed in the different housing segments. In some embodiments, the cable connector 140 is configured to include a first connector structure on one end and two or more connector structures on the other end. This allows for greater flexibility in selecting and designing the layout of the electrical components of the mobile computing device 100. Having a cable connector 140 that has two or more connector structures on one end of the cable connector 140 can be beneficial because of size and space constraints in designing a mobile computing device.

In other embodiments, the cable connector 140 has a least one flexible portion and one fixed portion along the cable 150.

On the opposing ends of the cable connector 140, the cable 150 is splayed (e.g. elements distributed row-wise) and connected to the corresponding connector structures. The cable 150 is also split along at least a length of the cable 150. The cable can have a fixed portion where the split cable portions are stacked on top of each other, while the flexible portion enables the cable 150 to move so that it can bend or curve when the two housing segments slide about each other. The cable connector 140 can provide high-quality signal performance while maintaining a connection between the electrical components of the mobile computing device 100.

In one embodiment, the mobile computing device 100 comprises a first housing segment 110 and a second housing segment 120. The first housing segment 110 and the second housing segment 120 are slideably coupled so that first housing segment 110 and the second housing segment 120 can slide about each other. The sliding direction 130 shows the direction in which the sliding can occur between the two housing segments. For example, in a first position (e.g., a closed position), the first housing segment 110 and the second housing segment 120 are positioned so that the two housing segments are aligned with each other. In a second position (e.g., an open position), the first housing segment 110 and the second housing segment 120 are positioned so that the mobile computing device 100 is in an extended position.

In one or more embodiments, the first housing segment 110 and the second housing segment 120 each contain a set of electrical components. The electrical components can include at least one of a display, a keyboard, audio components, network and radio resources, processing resources, memory, battery source, and other components, but are not illustrated in FIG. 1 for simplicity. Depending on the design of the mobile computing device 100, different electrical components can be contained in different housing segments. For example, in one embodiment, the first housing segment 110 can include a touch display screen, while the second housing segment 120 can include a processing resource and memory. Similarly, in other embodiments, the second housing segment 120 can include a touch display screen, while the first housing segment 110 can include a processing resource and memory.

Because the mobile computing device 100 has moving pieces (e.g., two housing segments), a flexible connector is required to interconnect the electrical components that are housed or included in the housing segments. Having the electrical components be interconnected by the connector enables images to appear on the display screen from input on a keyboard, for example, even if the display screen and the keyboard are included in different housing segments. The connector is also flexible enough to enable the housing segments to move about each other while maintaining the proper connections.

The cable connector 140 of the mobile computing device 100 includes a first connector structure 142, a second connector structure 144, and a third connector structure 146. The connector structures are interconnected by a cable 150. The connector structures 142, 144, 146 can be similar or different types of connectors, according to an embodiment, and can have different sizes or lengths. Each of the cable connectors 142, 144, 146 is configured to individually mate with a corresponding connector that is provided with or included in the electrical components.

As discussed, each of the housing segments includes various electrical components. In one embodiment, the first housing segment 110 can include a first set of electrical components while the second housing segment 120 can include a second set of electrical components. The different sets of electrical components can also include various connectors and/or ports to enable connections with other electrical components. The first set of electrical components (which are included in the first housing segment 110) can include a first connector, and the second set of electrical components (which are included in the second housing segment 120) can include a second and third connector. The first connector structure 142, the second connector structure 144, and the third connector structure 146 can be configured to mate with the first connector, the second connector, and the third connector, respectively.

In this manner, the cable connector 140 can interconnect the first set of electrical components with the second set of electrical components despite the two sets of electrical components residing in different housing segments of the mobile computing device 100. The cable connector 140 can also pass through a gap between the first housing structure 110 and the second housing structure 120.

In some embodiments, depending on the design and layout of the first set of electrical components, the first connector can be configured to have a certain number of contacts or pins that connect to the first set of electrical components. Similarly, depending on the design and layout of the second set of electrical components, the second and third connectors of the second housing segment 120 can be configured to each have a certain number of contacts or pins that connect to various parts or portions of the second set of electrical components. The connector structures 142, 144, 146 of the cable connector 140 are configured to mate with the first, second and third connectors, respectively, and also have a respective number of contacts or pins for properly mating with the connectors.

For example, the first connector can be coupled to a processing resource which has fifty pins or contacts to transmit and/or receive signals to and from a touch display screen and/or backlight component. The touch display screen may require thirty pins to transmit and/or receive signals to and from the processing resource, while the backlight component may require twenty pins, for example. The second connector is connected to the thirty pins and the third connector is connected to the twenty pins. The location of the connectors can be controlled in designing the mobile computing device 100. The second connector and the third connector can each be positioned in various locations within the second housing segment 120 (e.g., closer or further apart from each other, in a parallel orientation, in a perpendicular orientation, angled with respect to each other, lined up next to one another, etc.) depending on the layout of the electrical components and depending on the location of the contacts for the touch display screen and the backlight component.

The location and position of the first, second, and third connector structures 142, 144, 146 are dependent on the location of the three connectors within the housing segments. Because the cable connector 140 can be designed to have different size or length connector structures and because the cable 150 is flexible enough to enable movement (such as bend, curve, twist, etc.), there is more flexibility in designing the layout and selection of electrical components for mobile computing devices. The cable connector 140 can be used to interconnect the processing resource with the touch display screen and the backlight by configuring the first connector structure 142 to be mated with the first connector and configuring the second and third connector structures 144, 146 to be mated with the second and third connectors, respectively.

The connector structures 142, 144, 146 can have different sizes or lengths depending on the design and layout of the electrical components. In one or more embodiments, the first connector structure 142 is the largest connector structure of the three (e.g., the longest), while the second connector structure 144 and the third connector structure 146 are each configured to be smaller than the first connector structure 142. Because the cable connector 140 has two opposing ends connected together by the cable 150 (one end that includes the first connector structure 142, and the opposing end that includes the second and third connector structures 144, 146), the first connector structure 142 is designed to be larger than the other two connector structures 144, 146. Having an asymmetric cable connector 140 can be beneficial for design purposes, especially for small and thin housing segments, as discussed. The orientation and position of the connectors included in the second set of electrical components can save space and allow the second and third connector structures 144, 146 to fit in smaller spaces (e.g., the second and third connector structures 144, 146 are not as long as the first connector structure 142 and the cable 150 is flexible to bend, curve, or twist, etc.).

In one embodiment, the first connector structure 142 and the second connector structure 144 are positioned or arranged generally so that they are parallel with respect to each other (e.g., the longer sides of the first connector structure 142 and the second connector structure 144 are both facing out toward the same side of the mobile computing device 100). The third connector structure 146, however, is positioned generally in another direction from the lengthwise direction. For example, the third connector structure 146 may be arranged substantially perpendicular relative to the first and second connector structures (e.g., the longer side of the third connector structure 146 is facing out toward direction 148). More generally, the connector structure 142 and second connector structure 144 are aligned generally along a first mating direction, and the third connector structure 146 is generally aligned along another direction. The angle defining the difference in orientation may range between 30 and 120 degrees.

This can be beneficial for designing a small sliding phone where the second housing 120 contains electrical components where fitting a longer, bulkier connector structure can be more difficult or impossible. In other embodiments, the connector structures 142, 144, 146 can be positioned in different orientations, depending on the electrical components and their layouts (i.e., the connector structures can be positioned in different angles with respect to each other or be positioned closer or further apart).

The cable connector 140 also includes a cable 150 that interconnects the first connector structure 142, the second connector structure 144, and the third connector structure 146. The cable 150 is flexible to enable the cable to 150 twist, bend, or curve. This enables the electrical components contained in the first housing segment 110 and the electrical components contained in the second housing segment 120 to stay interconnected even when the mobile computing device 100 is in a first position (e.g., a closed position) or a second position (e.g., an open position). For example, in an open position, the first connector structure 142 will be furthest away from the second connector structure 144, while in a closed position, the first connector structure will be close to the second connector structure 144. In the closed position, the cable 150 will be more bent or curved than when in the open position. In some embodiments, the cable 150 can be a coaxial or micro-coaxial cable. A coaxial or micro-coaxial cable can provide shielding to help maintain the signal integrity of the signals being exchanged via the cable 150. A coaxial or micro-coaxial cable can also assist in reducing noise, which detrimentally affects the performance of the radio by decreasing the antenna strength.

Figure 2:
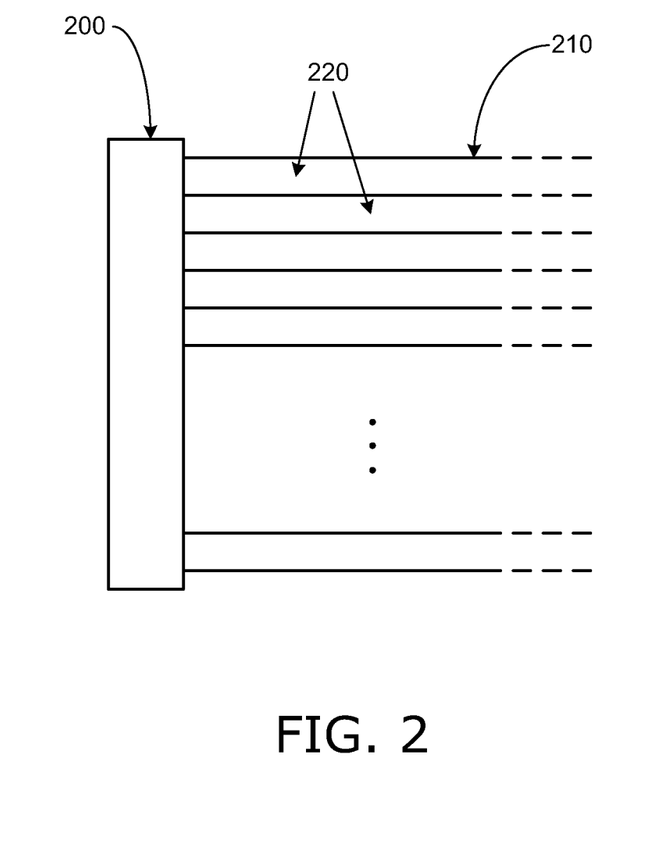
FIG. 2 is an illustration of a connector structure of a cable connector under an embodiment.

The cable 150 is also comprised of a plurality of strands (or wires) to carry signals. Each end of each strand terminates at the connector structures 142, 144, 146 by connecting to a pin or contact 160. Referring now to FIG. 2, an illustration of a connector structure is provided under an embodiment. In some embodiments, the connector structure 200 is representative of the connector structures 142, 144, 146 as described with reference to FIG. 1.

The connector structure 200 is connected to the cable 210. As discussed, the cable 210 includes a plurality of strands 220. Each end of the strand terminates at the connector structure 200 by connecting to a pin or contact provided on the connector structure 200. In one or more embodiments, the pins or contacts of the connector structure 200 are aligned in a linear fashion so that the plurality of strands 220 are also aligned linearly. In other embodiments, the pins or contacts can be positioned in a different manner, such as in a zigzag or asymmetrically. The strands 220 of the cable 210 can be grouped together in a line along a portion 230 of the length of the cable 210. In some embodiments, because the strands 220 terminate and connect to the pins or contacts of the connector structure 200, the strands 220 can be grouped together in a similar line near the end of the cable 210.

In one or more embodiments, each of the connector structures 200 of the cable connector is similarly designed. For a cable connector that has three connector structures 200, all three can be configured to have a set of contacts or pins that are aligned linearly. The cable 210 will be splayed so that each of the strands 220 of the cable 210 can couple to the contacts or pins of the connector structure 200. The strands 220 are grouped together and aligned, as seen in FIG. 2.

Referring back to FIG. 1, in some embodiments, the first, second and third connector structures 142, 144, 146 will each be configured to have a set number of contacts or pins 160. Because the contacts or pins 160 are aligned linearly for each of the connector structures 142, 144, 146, the strands of the cable 150 can also be grouped together in a line as seen in FIG. 2. This enables the cable 150 to be flattened (e.g., not bundled up in a cylindrical shape) along some portions of the cable connector 140, which can be beneficial for thin spaces, such as small and thin housing segments for a mobile device. In some embodiments, the thickness of the flattened cable 150 can be relatively similar to the thickness of the sheet metal or material of a portion of the housing segments.

In one embodiment, the number of strands that are included in the cable 150 are equal to the number of pins or contacts that are provided on the longest (or largest) connector structure. For example, the first connector structure 142 is the longest (or largest) connector structure of the three connector structures 142, 144, 146. If the first connector structure 142 includes fifty pins or contacts 160, the cable 150 also includes fifty strands. One end of each of the fifty strands will connect to each of the fifty pins or contacts 160 of the first connector structure 142, while the other end of each of the fifty strands will connect to the pins or contacts 160 of the second connector structure 144 and third connector structure 146 (e.g., twenty-five strands can connect to twenty-five pins of the second connector structure 144 and twenty-five strands can connect to the twenty-five pins of the third connector structure 146). The split can vary the number of pins that terminate at each of the connector structures depending on the layout and design of the electrical components and connectors (e.g., the split can be ten-forty strands, twenty-thirty strands, for example).

In some embodiments, the number of contacts or pins 160 that are provided on the longest (or largest) connector structure is equivalent to the number of contacts or pins 160 that are provided on the other two connector structures combined. The cable 150 can be split at one portion of its length so that the cable 150 can connect to the first connector structure 142 on one end and connect to the second and third connector structures 144, 146 on the other end. The split does not have to create equal sets of strands (e.g., if the first connector structure has fifty pins, the second connector structure can have ten pins and the third connector structure can have forty pins), but can be designed to create an unequal sets of cable strands. For example, depending on the design and layout of the electrical components within the housing segments of the mobile computing device 100, the number of contacts or pins 160 (as well as the number of strands in the cable 150) can be higher or lower than fifty. In addition, one end of the cable 150 can be split so that a first set of strands are connected to a connector structure that has twenty pins 160 and a second set of strands are connected to a connector structure that has thirty pins 160. Splitting the cable 150 can provide flexibility in designing the circuitry and layout of the components of the mobile computing device 100.

The strands of the cable 150 can be grouped together and aligned as seen in FIG. 2. As discussed, this enables the cable 150 to be flattened along some portions of the cable connector 140. The cable 150 can be split so that a portion of the cable is stacked on top of another along a portion of the length of the cable connector 140. This is illustrated below with respect to FIGS. 3A, 3B and 4.

Cable Connector

Figure 3A:
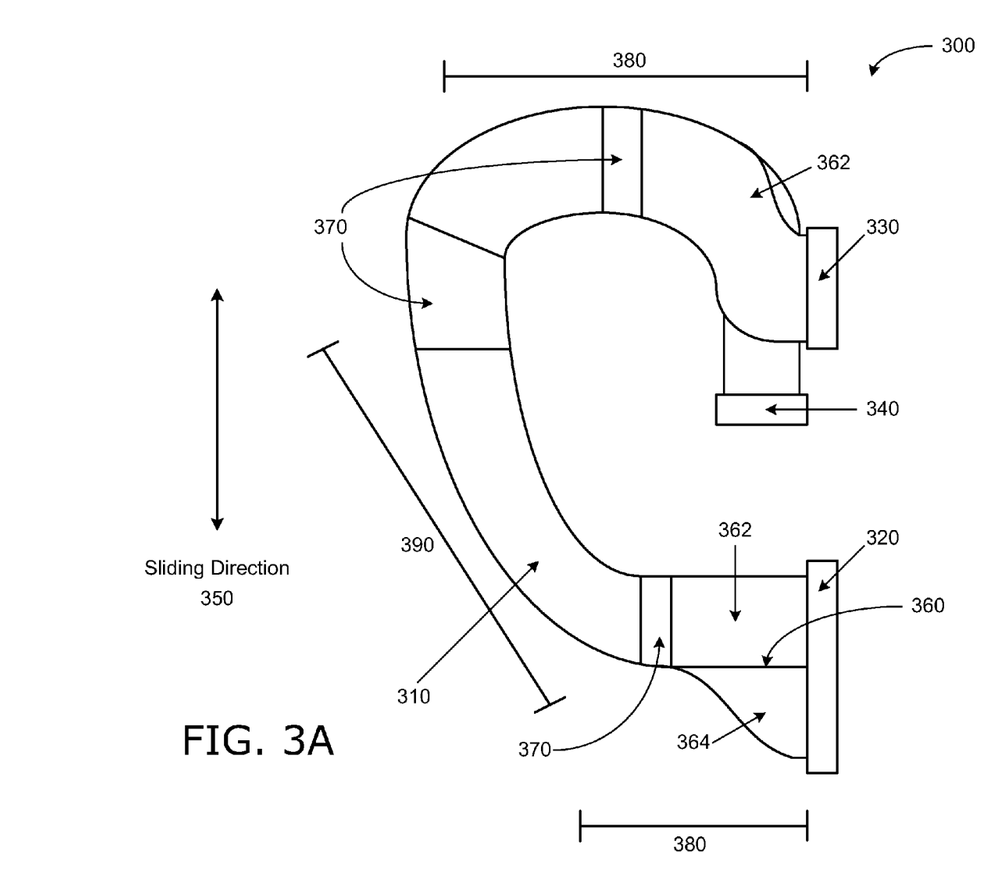
FIGS. 3A and 3B are illustrative representations of a cable connector, according to an embodiment.

FIG. 3A is an illustrative representation of a cable connector, according to an embodiment. The cable connector 300 includes a cable 310 and three connector structures 320, 330, 340. The cable 310 can be a coaxial cable or micro-coaxial cable in some embodiments. The cable 310 has a plurality of strands that can be grouped together and aligned along a portion of the cable 310, as described with respect to FIGS. 1 and 2. The first connector structure 320 can be housed in the first housing segment of the mobile computing device, while the second connector structure 330 and the third connector structure 340 can be housed in the second housing segment, or vice versa. This enables the electronic components in both housing segments to be interconnected. The sliding direction 350 illustrates the direction in which the housing segments can slideably move about each other.

Each of the connector structures 320, 330, 340 are configured to mate with a corresponding connector that is included in or provided with the sets of electrical components. With the movement of the housing segments in the sliding direction 350, portions of the cable connector 300 can also move (e.g., bend, curve, twist, etc.), while the connector structures 320, 330, 340 stay connected to the electrical components. In other embodiments, the sliding direction can be in an alternate direction (such as left to right instead of up and down, with respect to FIG. 3), depending on the design of the mobile computing device.

In one or more embodiments, at the first connector structure 320, the cable 310 is splayed so that the strands of the cable are grouped together and aligned (like in FIG. 2). The cable 310 is relatively flat and not bundled in a cylindrical shape. The cable 310 is grouped so that there is a split 360 so that a first set of strands 362 are grouped together and aligned, and the second set of strands 364 are also grouped together and aligned. Along at least a portion of the length of the cable connector 300, the second set of strands 364 is positioned underneath the first set of strands 362 so that the first set of strands 362 overlaps (e.g., lays on top of) the second set of strands 364, or vice versa. In some embodiments, if the split 360 is in the middle of the cable 310, the first set and second set of strands 362, 364 are overlapped and grouped together as an array of strands along a portion of the cable 310 (e.g., two rows of strands with an equal number of strands in each row).

In some embodiments, the set of strands are stacked and held together by an adhesive tape 370 or other means for holding the strands together. Because the first set and second set of strands 362, 364 are relatively flat and thin, the stacked configuration is also relatively flat and thin. This is beneficial for housing segments that are also thin and small for mobile computing devices. In other embodiments, there are multiple adhesives 370 to help keep the stacked configuration and/or group the set of strands together.

Along the length of the cable 310, portions of the cable 310 will be in a partially stacked configuration (such as near the ends of the cable connector 300), stacked configuration, and/or an ungrouped configuration. For example, near the second connector structure 330 and the third connector structure 340, portions of the cable 310 are partially stacked. The second set of strands 364 is extended further out from underneath the first set of strands 362 to connect to the third connector structure 340. Depending on the design and layout of the electrical components that the cable connector 300 is connected to, the sets of strands can have different lengths. In one embodiment, the connectors that the second and third connector structures 330, 340 are configured to mate to can be positioned parallel or perpendicular to each other, further or closer away, or angled about each other. Depending on the position and orientation of the connectors, the second set of strands 364 can be longer or shorter than the first set of strands 362.

The cable connector 300 also has a fixed portion region 380 and a flexible portion region 390. The fixed region 380 is near the ends of the cable connector 300, while the flexible portion region 390 is near the middle of the cable connector 300 so that it can bend, curve, or twist when the two housing segments are slideably moved about each other. It is important to note that "fixed" does not necessarily mean that there is no possible way to bend, curve, for twist the cable; instead, a fixed region is configured to be more stationary than a flexible region. In some embodiments, the fixed region 380 comprises an area or portion of the cable 310 that is close to the three connector structures 320, 330, 340. Because these connector structures 320, 330, 340 must maintain their connectivity with the connectors coupled to the electrical components, the fixed area is more stationary so that the connector structures 320, 330, 340 do not move as much (or at all) when the housing segments are slideably moved about each other. On the other hand, the portion of the cable 310 in the flexible region 390 is in an ungrouped configuration so that the strands can move, bend, flex, or curve, etc. more freely than the fixed region 380 when the housing segments are slideably moved about each other.

As discussed, the split 360 can split the cable 310 into different sized sets of strands 362, 364. Depending on the design and layout of the electrical components, the split 360 can split the cable 310 into equal or unequal sets of strands. For example, the split 360 can cause a first set of strands 362 to have thirty strands and a second set of strands 364 to have twenty strands. In other embodiments, there can be multiple splits and three or more connector structures on one end of the cable connector 300. The three or more sets of strands can also be stacked on top of each other along portions of the cable 310.

Figure 3B:
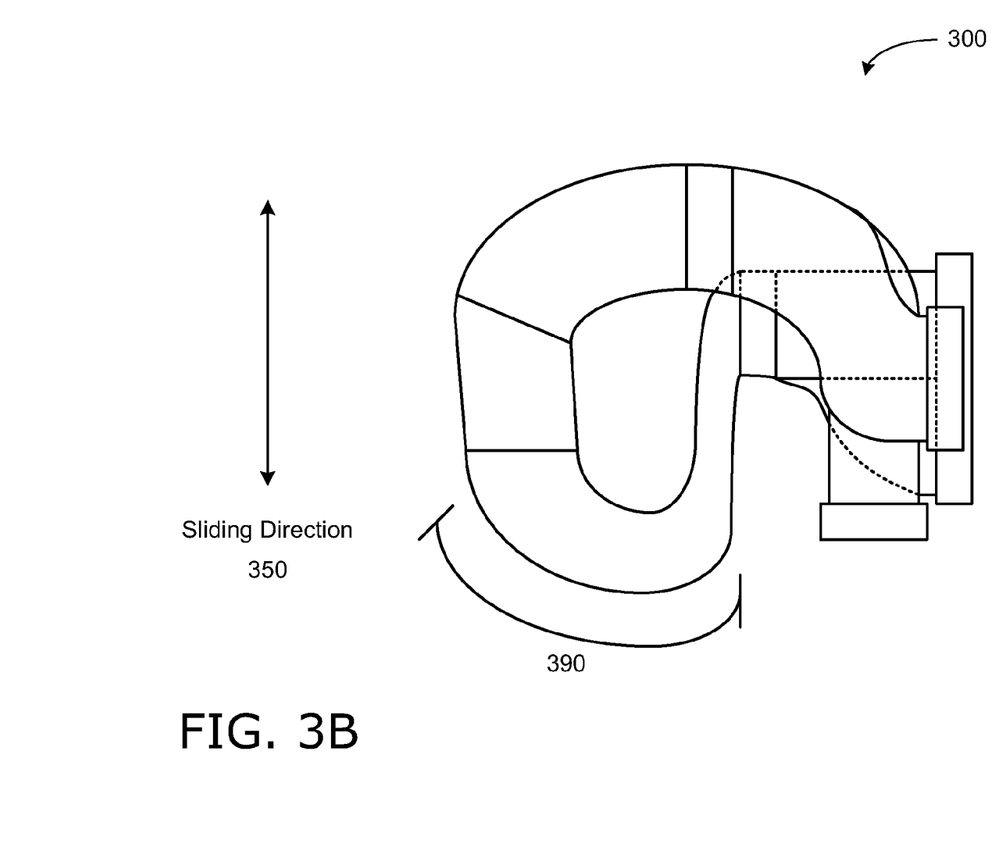

FIG. 3B is another illustrative representation of a cable connector, according to another embodiment. FIG. 3B illustrates the cable connector 300 that is in a different position than the cable connector 300 in FIG. 3A. For example, in FIG. 3A, the cable connector 300 is in an extended position. The extended position of the cable connector 300 corresponds to the second position (e.g., an open position) of the mobile computing device where the two housing segments are positioned so that the length of the mobile computing device is at its largest. In FIG. 3B, the cable connector 300 is in a contracted position. The contracted position of the cable connector 300 corresponds to the first position (e.g., a closed position) of the mobile computing device where the two housing segments are positioned so that the length of the mobile computing device is at its smallest.

The strands of the cable 310 that are in the flexible region 390 are bent, curved, or twisted so that the connector structures 320, 330, 340 can maintain their connection with the corresponding connectors. The strands of the cable 310 that are in the fixed region 380, on the other hand, maintain the similar flat, aligned position whether the cable connector 300 is in an extended position (as illustrated in FIG. 3A) or a contracted position (as illustrated in FIG. 3B). In one embodiment, when the cable connector 300 is in either the extended position or the contracted position, the strands of the cable 310 that are in the fixed region 380 remain in a partially stacked or a stacked position configuration.

Figure 4A:
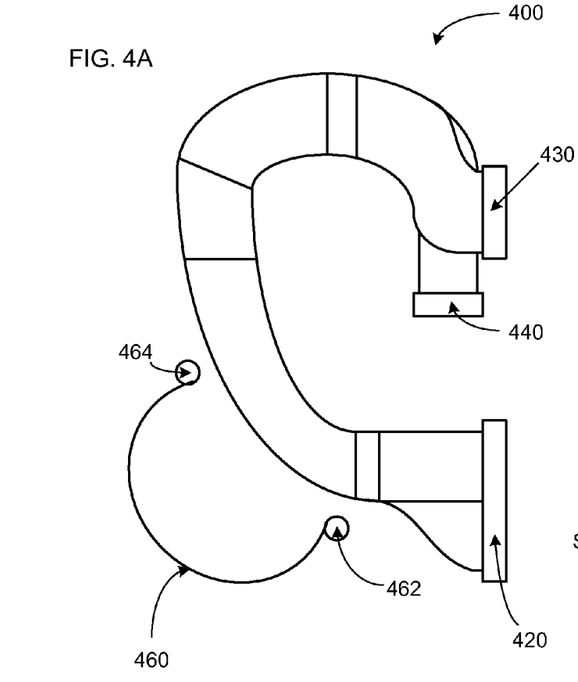
FIGS. 4A and 4B are illustrative representation of a cable connector under an embodiment.
Figure 4B:
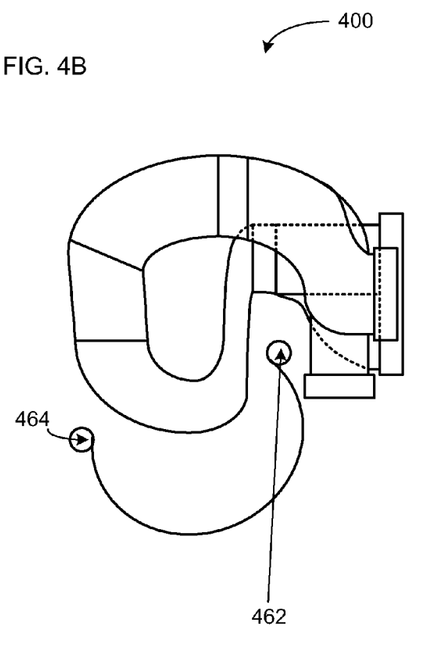

FIGS. 4A and 4B are illustrative representations of a cable connector under an embodiment. The cable connector 400 is shown in an extended position in FIG. 4A and in a contracted position in FIG. 4B. Like the cable connector 300 in FIGS. 3A and 3B, the cable connector 400 can interconnect electrical components within the housing segments of a mobile computing device. With the movement of the housing segments in the sliding direction 450, portions of the cable connector 400 can also move (e.g., bend, curve, twist, etc.), while the connector structures 420, 430, 440 remain connected to the electrical components. In one or more embodiments, the cable connector 400 can be positioned near a spring 460. The spring 460 is configured to assist or enable the two housing segments to slideably move between a first position (e.g., a closed position) and a second position (e.g., an open position) easily.

In some embodiments, the spring 460 has one end that is included in one housing segment and another end that is included in the other housing segment (like the cable connector 400). For example, the electronic components of the mobile computing device can be designed or laid out so that the first connector structure 420 is included in the first housing segment, while the second and third connector structures 430, 440 are included in the second housing segment. Similarly, the first end 462 of the spring 460 can be coupled to part of the first housing segment, while the second end 464 of the spring 460 can be coupled to the second housing segment. The ends 462, 464 of the spring 460 do not move, but instead move with the housing segments (because the ends are each coupled to a housing segment).

As illustrated in FIGS. 4A and 4B, when a user moves the housing segments so that the mobile computing device changes from a second position (e.g., an open position) to a first position (e.g., a closed position), the spring 460 can assist or enable the two housing segments to slideably move. The sliding direction 450, in this case, would be going in the upward direction from FIG. 4A to FIG. 4B. In the closed position, the cable connector 400 bends or curves so that the cable 410 can be positioned within a reserved space of the spring 460. This can be beneficial in saving space when the size and space within the housing of a mobile device can be a physical constraint in designing the device.

Figure 5:
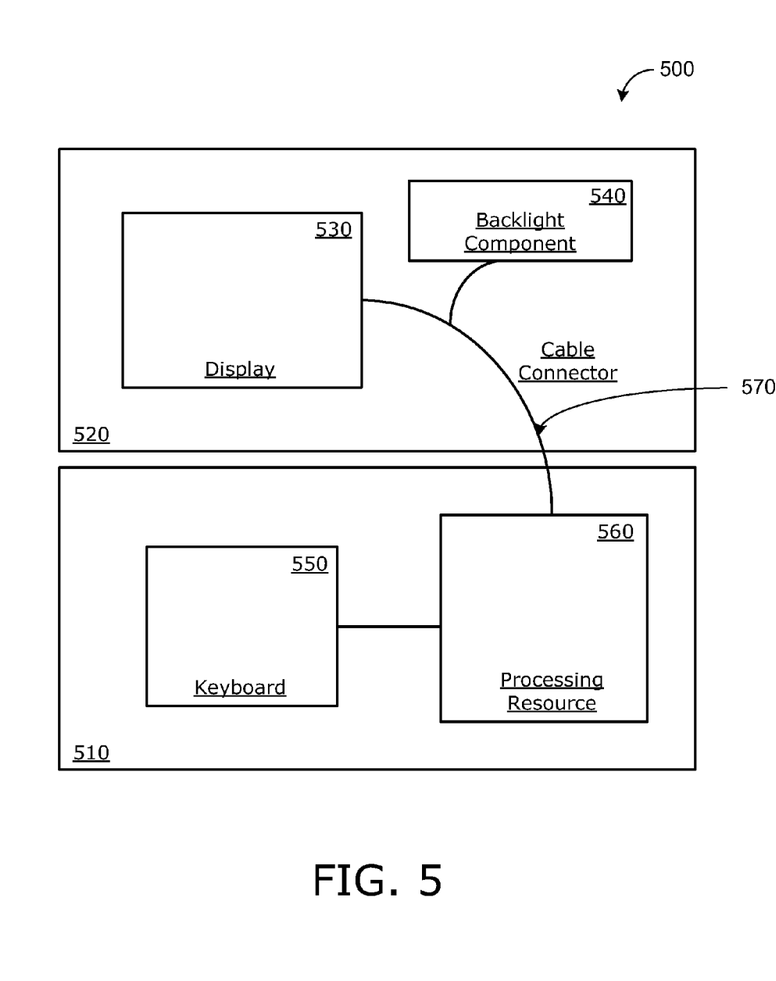
FIG. 5 is a block diagram of a mobile computing device under an embodiment.

FIG. 5 illustrates a hardware diagram of a computing device that is configured to support any of the embodiments described herein. An embodiment of FIG. 5 is depicted as a mobile computing device 500. In particular, embodiments pertain to a smart phone that comprise two housing segments. In one or more embodiments, the first housing segment 510 and the second housing segment 520 each contain a set of electrical components. The electrical components can include at least one of a touch display screen, a keyboard, audio components, network and radio resources, processing resources, data ports, memory, battery source, and other components, but are not all illustrated in FIG. 1 for simplicity.

The mobile computing device 500 comprises a touch display screen 530, a backlight component 540, a keyboard 550 and a processing resource 560. The first housing segment 510 includes the keyboard 550 and the processing resource 560, while the second housing segment 520 includes the touch display screen 530 and the backlight component 540. A cable connector 570, such as described with respect to FIGS. 1-4, interconnects the touch display screen 530, the backlight component 540 and the processing resource 560 together. In some embodiments, the cable connector 570 comprises a coaxial or micro-coaxial cable. A coaxial or micro-coaxial cable can provide shielding to help maintain the signal integrity of the signals being exchanged via the cable connector 570. A coaxial or micro-coaxial cable can also assist in reducing noise, which detrimentally affects the performance of the radio by decreasing the antenna strength of a device.

The cable connector 570 has one end that is connected to the processing resource 560 via a first connector structure, while the other end is connected to the display 530 and the backlight component 540 via a second connector structure and third connector structure, respectively. As discussed, the cable of the cable connector 570 is split along at least a length of the cable so that a set of strands of the cable are stacked on top of another set of strands.

Other embodiments include a cable connector that has three or more connector structures on one end of the cable. The layers of the strands can be stacked on top of one another to save space. In another embodiment, the cable connector can have multiple connector structures on each end so that there is more flexibility for the design and layout of electrical components of small mobile computing devices.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:
1. A mobile computing device comprising:
   a first segment containing a first set of electrical components;
   a second segment containing a second set of electrical components and slideably coupled to the first segment to move between a first position and a second position; and a cable connector that connects the first set of electrical components to the second set of electrical components, wherein the cable connector includes:
    a first connector structure configured to mate with a first connector of the first segment in connecting to the first set of electrical components;
    a second connector structure configured to mate with a first connector of the second segment in connecting to a first portion of the second set of electrical components; and
    a third connector structure configured to mate with a second connector of the second segment in connecting to a second portion of the second set of electrical components.

2. The mobile computing device of claim 1, wherein the cable connector includes a cable that interconnects the first connector structure, the second connector structure and the third connector structure, and wherein the cable is split at one portion of its length.

3. The mobile computing device of claim 2, wherein the cable is a coaxial cable.

4. The mobile computing device of claim 2, wherein the first connector structure is splayed to provide a number (N) of connection points in a linear fashion.

5. The mobile computing device of claim 4, wherein the second connector structure provides N-X connection points in a linear fashion, and the third connector structure provides X connection points in a linear fashion.

6. The mobile computing device of claim 5, wherein the cable includes N plurality of strands that connect to the connection points provided on the first connector structure.

7. The mobile computing device of claim 6, wherein the N plurality of strands includes N-X strands that connect to the connection points provided on the second connector structure and X strands that connect to the connection points provided on the third connector structure.

8. The mobile computing device of claim 7, wherein the N-X strands are stacked on top of the X strands along at least a portion of the length of the cable.

9. The mobile computing device of claim 7, wherein the X strands are stacked on top of the N-X strands along at least a portion of the length of the cable.

10. The mobile computing device of claim 1, wherein the first connector of the second segment and the second connector of the second segment are positioned so that they are perpendicular to each other.

11. The mobile computing device of claim 2, wherein the cable includes at least a flexible portion and at least a fixed portion along its length.

12. The mobile computing device of claim 1, wherein the first segment includes a processing resource and a keyboard assembly and the second segment includes a display component.

13. The mobile computing device of claim 1, wherein the first segment includes a display component and the second segment includes a processing resource and a keyboard assembly.

14. The mobile computing device of claim 2, further comprising a spring to assist or enable the second segment to slideably move between the first position and the second position.

15. The mobile computing device of claim 14, wherein the cable flexes, bends, or curves more when the second segment is in the first position than when the second segment is in the second position.

16. The mobile computing device of claim 15, wherein the cable is positioned within a reserved space of the spring when the second segment is in the first position.

\* \* \* \* \*